United States Patent
Palazzolo et al.

(10) Patent No.: US 9,815,366 B2
(45) Date of Patent: Nov. 14, 2017

(54) TRANSFER CASE

(71) Applicant: BorgWarner Inc., Auburn Hills, MI (US)

(72) Inventors: Michael R. Palazzolo, Madison Heights, MI (US); Paul M. Riggs, West Bloomfield, MI (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 15/428,419

(22) Filed: Feb. 9, 2017

(65) Prior Publication Data

US 2017/0232839 A1    Aug. 17, 2017

Related U.S. Application Data

(60) Provisional application No. 62/296,408, filed on Feb. 17, 2016.

(51) Int. Cl.
| | | |
|---|---|---|
| *B60K 17/344* | (2006.01) | |
| *F16H 37/06* | (2006.01) | |
| *F16H 63/08* | (2006.01) | |
| *F16D 27/118* | (2006.01) | |
| *F16D 27/108* | (2006.01) | |

(52) U.S. Cl.
CPC ......... *B60K 17/344* (2013.01); *F16H 37/065* (2013.01); *F16H 63/08* (2013.01); *F16D 27/108* (2013.01); *F16D 27/118* (2013.01)

(58) Field of Classification Search
CPC ...... B60K 17/344; F16H 37/065; F16H 63/08
See application file for complete search history.

(56) References Cited

U.S. PATENT DOCUMENTS

| 4,883,138 A | * | 11/1989 | Kameda | ................. | B60K 23/08 |
| | | | | | 180/248 |
| 5,363,938 A | * | 11/1994 | Wilson | .................. | B60K 23/08 |
| | | | | | 180/233 |
| 5,380,255 A | * | 1/1995 | Brissenden | .......... | B60K 17/342 |
| | | | | | 180/233 |

(Continued)

*Primary Examiner* — Derek D Knight
(74) *Attorney, Agent, or Firm* — Warn Partners, P.C.

(57) ABSTRACT

A vehicle transfer case is provided including input and output shafts mounted within a housing, a secondary shaft selectively driven by the output shaft, a first hub having an inner diameter splined section having a first extreme neutral position with exclusive torsional engagement with the output shaft, and in a second intermediate high position having torsional engagement with the output shaft and input shafts, and in a third extreme low position having exclusive torsional engagement with the input shaft. A second hub is provided, rotatably mounted on the first hub and axially fixed therewith. The second hub is torsionally fixed to the output shaft, and a shift fork is provided to translate the second hub. A planetary gear set is provided, having a ring gear, a plurality of planet gears connected to each other by a carrier and a sun gear; and wherein in the extreme neutral position the output shaft is disengaged from the input shaft, and in the second intermediate position the input shaft is directly connected to the output shaft without rotating the planetary gear set, and in the extreme third position the first hub torsionally connects the input shaft to the sun gear, and the second hub is connected with the carrier.

12 Claims, 2 Drawing Sheets

(56) References Cited

U.S. PATENT DOCUMENTS

| | | | |
|---|---|---|---|
| 5,643,129 A | | 7/1997 | Richardson |
| 5,711,740 A | | 1/1998 | Bakowski |
| 5,833,566 A | * | 11/1998 | Showalter .......... B60K 17/3467 |
| | | | 180/247 |
| 5,980,415 A | | 11/1999 | Showalter |
| 9,630,491 B2 | * | 4/2017 | Larkin ................... F16H 63/16 |
| 2013/0345015 A1 | * | 12/2013 | Larkin ................ B60K 17/344 |
| | | | 475/295 |
| 2015/0246611 A1 | | 9/2015 | Larkin et al. |
| 2017/0130838 A1 | * | 5/2017 | Imafuku ............... F16H 63/304 |
| 2017/0152933 A1 | * | 6/2017 | Drill ................... F16H 57/0409 |
| 2017/0158053 A1 | * | 6/2017 | Bunyan ............... B60K 17/344 |

\* cited by examiner

TRANSFER CASE

CROSS-REFERENCE TO RELATED APPLICATIONS

This application claims the benefit of U.S. Provisional Application No. 62/296,408, filed Feb. 17, 2016. The disclosure of the above application is incorporated herein by reference.

FIELD OF THE INVENTION

The present invention relates to transfer cases in normally rear wheel drive vehicles with selective four wheel drive capabilities. More particularly the field of the present invention relates to the aforementioned transfer cases having high and low gear capabilities.

BACKGROUND OF THE INVENTION

Referring to FIG. 1, an example of a transfer case 7 is shown. The transfer case 7 has a housing 10. The housing 10 has a front cover plate 12 that is boltably connected to a main body 14. Rotatably mounted within the transfer case housing 10 is an output or primary shaft 16. The primary shaft 16 has a front end that can be selectively torsionally connected with an input shaft 17. Input shaft 17 is connected with an output shaft (not shown) of a transmission of the vehicle. Typically, the vehicle is a rear wheel drive vehicle with a longitudinally mounted engine. The drive train for the vehicle is configured in such a way that power can be selectively diverted from a rear axle to be shared with a front axle to provide the vehicle with all wheel drive capability. The primary shaft 16 is mounted within the front cover plate 12 by needle bearings 20 within an axial bore of the input shaft 17. A rearward portion of the primary axle 16 is rotatably mounted within the housing main body 14 by a rear bearing 22. A rear end of the primary shaft (not shown) is connected with a yoke (not shown) that is connected with a drive line extending to a vehicle rear differential and axle (not shown).

At a lower elevation, the transfer case 7 also rotatably mounts a secondary shaft 34. The secondary shaft 34 is configured to power either directly or via a universal type joint, a front drive line shaft (not shown) that is torsionally connected with a differential for the front wheels of the vehicle. In another embodiment (not shown), the secondary shaft 34 can be connected with a front wheel drive line via a flange connection. An exterior of the secondary shaft is connected with a sprocket 38. The sprocket 38 engages a flexible torsional force transfer member or a belt (shown schematically) which is typically provided by a multi-link chain 40. The chain 40 is engaged with a primary sprocket 44. The primary sprocket 44 is rotatably mounted on the primary shaft 16.

To allow the primary shaft 16 to selectively torsionally engage the secondary shaft 34, there is provided an electromagnetic clutch 50. The clutch 50 has a housing 52 that is spline connected to the primary shaft 16. The housing 52 has annular cup 53 formed about an annular shape electromagnet 56. When actuated the electromagnet 56 attracts a clutch plate 58 to make contact therewith. Clutch plate 58 pulls back a housing 60 that is axially spline connected to the primary sprocket 44. Clutch plates 58 connection with annular cup 52 torsionally connects the primary sprocket 44 with the shaft 16 allowing the primary shaft 16 to selectively power the secondary sprocket 38 and its associated secondary shaft 34.

Transfer case 7 also has a hub 70. Hub 70 on its outer diameter has a stub gear 72. Stub gear 72 is spline connected to an inner diameter bore of the input shaft 17 (in stub gear's 72 forward position). Input shaft 17 on its outer diameter has an integrally formed sun gear 74. Sun gear 74 engages with a planet gear 76 that in turn spins about a carrier pin 78. Planet gear 76 also engages with a ring gear 80 that is fixed within the transfer house front plate 12. Hub 70 along its inner diameter is spline connected to the primary shaft 16. Hub 70's position shown in FIG. 1 torsionally connects the primary shaft 16 with the input shaft 17 for high gear range operation for either four wheel or two wheel drive operation dependent upon the position of clutch 50. When a low gear range operation is desired, a shift fork 82 moves hub 70 (rearward) causing the stub gear 72 of the hub 70 to engage with inner diameter gear 86 provided by carrier plate 88 which is fixedly connected with carrier pins 78. Stub gear 72 is now torsionally connected with carrier plate inner diameter gear 86 and power from input shaft 17 flows through its integral sun gear 74, planet gear 76, in a reduced gear ratio causing movement of carrier pins 78 in the same direction of the input shaft. Power is then delivered through carrier gear 86 into the stub gear 72 into the output shaft 16. If a neutral output is desired the shift fork positions the hub 70 in a position that its stub gear 72 proximately in a space 90 that is not engaging either the input shaft 17 or with the carrier gear 86 thereby essentially disengaging the primary shaft 16 from input shaft 17. Positioned generally rearward of the shift fork 82 and forward of the primary sprocket is a gear rotor type oil pump 92. As apparent to one skilled in the art, when transfer case 7 is in a high gear operating as shown in FIG. 1, there is still engagement between the sun gear 74 the input shaft 17 causing parasitic loss by its engagement of planet gears 72 of planetary gear set. It is desirable to provide a transfer case wherein the transfer case can have a high gear mode and a low gear mode wherein the low gear mode is provided by planetary gear system wherein when the transfer case is in a high gear mode of operation the planetary gear set is not engaged.

Many vehicles with transfer cases with high and low gear outputs are utilized in off road type SUV's and pickup trucks. It is often desirable to be able to tow SUV's or pickup trucks on all four wheels, especially when towing over long distances. To accommodate long distance towing on all four wheels, many transfer cases in combination of high and low gear settings also have a neutral setting. When the transfer case is in a neutral setting the transmission of the vehicle is torsionally isolated from the front and rear axles. If the transmission is isolated from both the front and rear axles, the vehicle can be towed on all four wheels without rotation of the transmission. The transmission is not damaged due to rotation without being supplied with lubricant from the transmission oil pump (typically powered by the vehicle engine, which is turned off during long distance towing). However, when the transfer case is in neutral, and the transmission is in park, the vehicle is free to roll forwards or backwards. Therefore, it is very important that the operator of the vehicle be cognizant of the fact when the transfer case is in the neutral position. To inform the vehicle operator that the transfer case is in the neutral position, the transfer case is reliant upon positional sensors. Due to dimensional tolerances and spring compliance of assembled components, it can be difficult for a sensor to determine if the transfer case is in high gear, low hear or neutral. Therefore, it is highly desirable that the neutral position be at an extreme position of the shift fork so that when the transfer case is in a neutral position, the determination of the transfer case status can be clearly determined. Therefore, it is also desirable that the shift from low gear to high gear mode of operation of the transfer case be immediate without a neutral position between the low gear mode of operation and a high gear mode of operation. Accordingly, the neutral position of the transfer case shift fork should be an extreme position.

SUMMARY OF THE INVENTION

To make manifest the above noted and other desires, a revelation of the present invention is brought forth. The present invention endows a freedom of a vehicle transfer case including input and output shafts rotatably mounted within a housing, and a secondary shaft selectively driven by the output shaft. A first hub is also provided having an inner diameter splined section having in a first extreme neutral position with exclusive torsional engagement with the output shaft, and in a second intermediate high position, the inner diameter spline section having torsional engagement with the output shaft and the input shaft, and in third extreme low position, the inner diameter spline section having exclusive torsional engagement with the input shaft. A second hub is provided, rotatably mounted on the first hub and being axially fixed therewith, the second hub being torsionally fixed to the output shafts. A shift fork is provided to translate the second hub. A planetary gear set is provided having a ring gear fixed with the housing and a plurality of planet gears meshed with the ring gear. A carrier is provided having connected pins extending through the planet gears. A sun gear is provided with an exterior meshed with the planet gears. In the extreme third neutral position, the output shaft is disengaged from the input shaft, and in the second intermediate position the input shaft is directly connected to the output shaft without rotating the planetary gear set. In the extreme third position, the first hub torsionally connects the input shaft to the sun gear and the second hub is torsionally connected with the carrier to give the transfer case a reduced low gear output.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
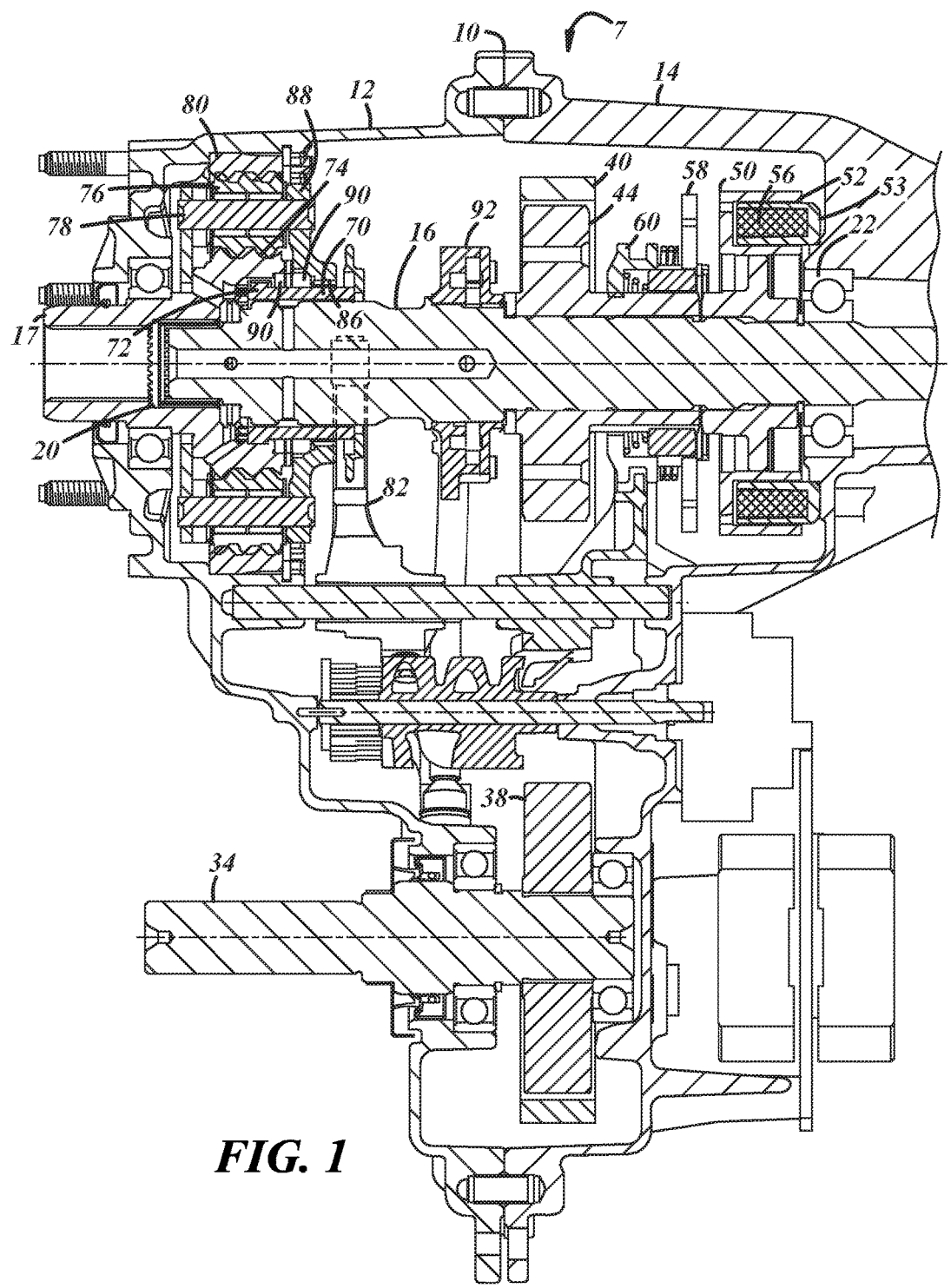
FIG. 1 is a sectional view of a transfer case prior to that of the present invention.
Figure 2:
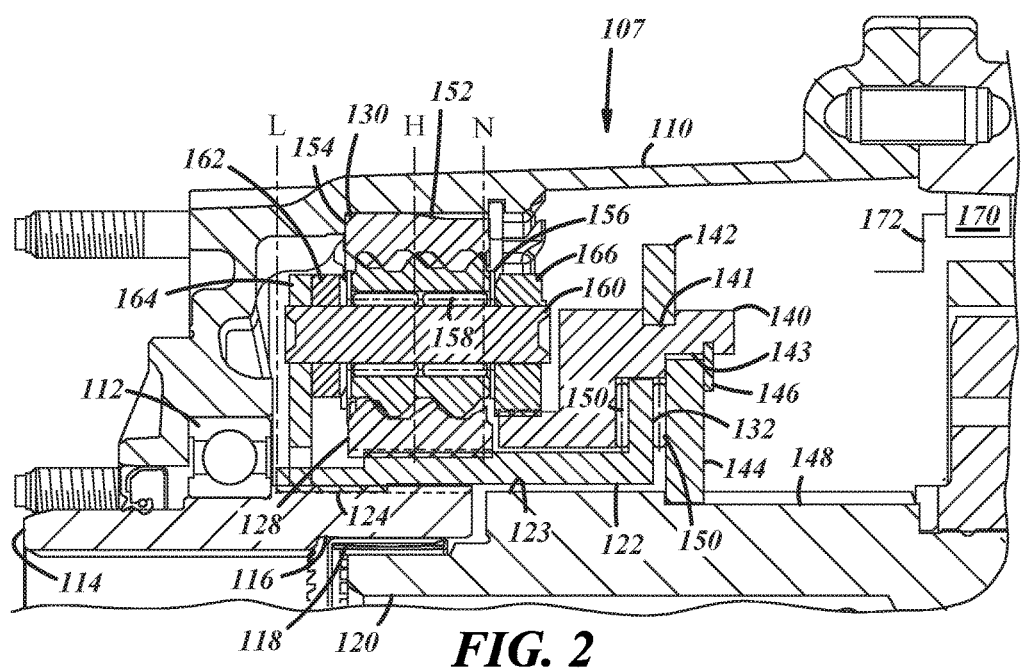
FIG. 2 is an enlarged sectional view of a transfer case of the present invention in a low gear operational position.
Figure 3:
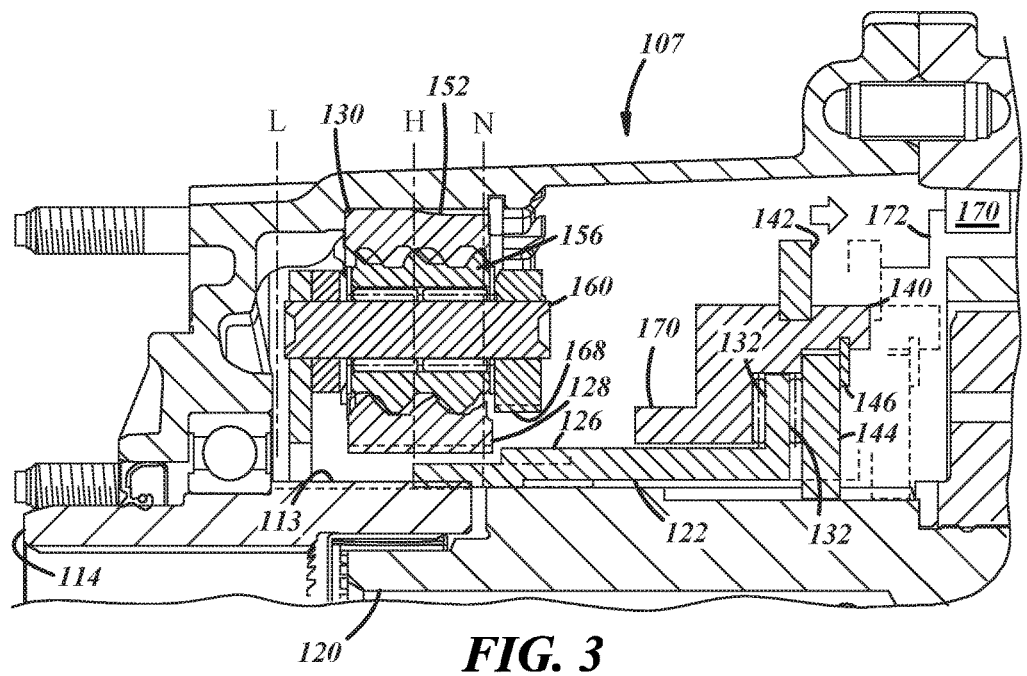
FIG. 3 is a view of the transfer case shown in FIG. 2 in an extreme neutral position.

Referring to FIGS. 2 and 3, the inventive transfer case 107 of the present invention has a housing 110. Rotatably mounted within the housing 110 by a front bearing 112 is an input shaft 114. The input shaft at its forward end is connected with an output shaft of a transmission (not shown).

A rearward end of the input shaft 114 has an inner diameter 116 that has inserted therein needle bearing 118. Needle bearing 118 supports a forward end of an output (primary) shaft 120. The output shaft 120 has its rearward end supported in the housing 110 in a manner similar to that of the output shaft 16 being supported by bearing 22 in the prior described transfer case 7. The output shaft 120 is axially aligned with the input shaft 114. The transfer case has a secondary shaft and secondary sprocket similar or identical to the secondary shaft 34 and sprocket 38 shown for transfer case 7. The secondary shaft for the transfer case 107 is selectively driven in a manner similar or identical to that previously described for torsional connecting a chain to a primary sprocket 44 via a clutch 50 as previously described for the transfer case 7.

The transfer case 107 has a first hub 122. The first hub along a portion of its inner diameter has a splined section 124. In an extreme neutral rearward position (shown in phantom in FIG. 3), the first hub 122 inner diameter splined section 124 has exclusive torsional engagement with a splined section 123 of output shaft 120. In a second intermediate high gear position, the inner diameter splined section 124 has torsional engagement the output shaft 120 and the input shaft 114. In a third forward extreme low gear position, the inner diameter splined section 124 has exclusive torsional engagement with a splined portion 113 of input shaft 114. An outer diameter section 126 of the first hub 122 has gear teeth formed thereon for meshed engagement with a sun gear 128 of a planetary gear set 130. The first hub 122 also has a radial 132 flange.

Transfer case 107 also has a second hub 140 having an outer diameter indention 141 for receipt of a shift fork 142. The second hub is rotatively mounted on the first hub 122. Second hub 140 also has an inner diameter indention 143 which receives an annular plate 144 that is kept in place by a lock ring 146. The plate 144 is torsionally connected with the second hub 140 as well as to an indented splined portion 148 of output shaft 120. Therefore the hub 140 is torsionally fixed to the output shaft 120. The plate 144 axially connects the first hub 120 to the secondary hub 140 by capturing the first hub radial flange 144 between two axially spaced needle bearings 150.

Planetary gear set 130 has a ring gear 152 that is abuttingly fixed against a shoulder stop 154 of housing. In mesh with the ring gear 130 is a plurality of planet gears 156. The planet gears 156 by virtue of needle bearings 158 are rotatably mounted about carrier pin 160. The carrier pins 160 are connected at their forward end with carrier plates 162 and 164. At a rearward end carrier pins 160 are connected with a carrier plate 166. An inner diameter of carrier plate 166 has a gear tooth surface so as to mesh with a gear toothed surface 170 provided on the secondary hub.

As shown in FIG. 3 (in phantom) when the first hub 122 is in the first extreme rearward or neutral position, the planetary gear set 130 is not engaged. When the first hub 120 is in the second intermediate high gear position, the inner diameter splined section 120 directly connects the input shaft 114 to the output shaft 120 and the planetary gear set 130 is not engaged. Only when the first hub 122 is in the third extreme forward low-gear position (FIG. 2), is the gear toothed section 126 of the first hub engaged with sun gear 128 which in turn causes the planet gears 156 to be rotated between the sun gear 128 and the ring gear 152 thereby causing the carrier plates 166 162 164 to rotate and to engage the toothed portion 170 of second hub thereby cause the output shaft 122 to rotate at a lower gear ratio.

A sensor 170 is provided having a probe 172. Probe 172 makes contact with shift fork 142, or in an alternate embodiment (not shown) with the second hub 140 to confirm that the transfer case is in neutral position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle transfer case comprising:
a housing;
an input shaft rotatably mounted within said housing;
an output shaft rotatably mounted within said housing axially aligned with said input shaft;
a secondary shaft selectively driven by said output shaft, said secondary shaft being rotatably mounted by said housing;
a first hub having an inner diameter splined section having in a first extreme neutral position with exclusive torsional engagement with said output shaft, and in a second intermediate high gear position, said inner diameter spline section having torsional engagement with said output shaft and said input shaft, and in a third extreme low gear position, said inner diameter spline section having exclusive torsional engagement with said input shaft;
a second hub rotatably mounted on said first hub and being axially fixed therewith, said second hub being torsionally fixed to said output shaft;
a shift fork to translate said second hub;
a planetary gear set having a ring gear fixed with said housing, a plurality of planet gears meshed with said ring gear and connected to each other by a carrier, said carrier having connected pins extending through said planet gears, a sun gear with an exterior meshed with said planet gears; and
wherein in said first extreme neutral position said output shaft is disengaged from said input shaft, and in said second intermediate position said input shaft is directly connected to said output shaft without rotating said planetary gear set, and in said third extreme position said first hub is torsionally connects said input shaft to said sun gear and said second hub is torsionally connected with said carrier to give said transfer case a reduced low gear output.

2. The transfer case of claim 1 wherein said first position is rearward and said third position is forward.

3. The transfer case of claim 1 wherein said second hub is torsionally connected with said carrier at a diameter less than that of said carrier pin.

4. The transfer case of claim 1 wherein said transfer case has a front cover plate boltably connected to a main body and said planetary gear set is positioned within said front plate.

5. The transfer case of claim 1 wherein there is a sensor to determine when said transfer case is in said first position.

6. The transfer case of claim 1 wherein said sensor makes contact at least one of a set including said shift fork and said second hub.

7. A vehicle transfer case comprising:
a housing;
an input shaft rotatably mounted within said housing;
an output shaft rotatably mounted within said housing axially aligned with said input shaft;
a secondary shaft selectively driven by said output shaft, said secondary shaft being rotatably mounted by said housing;
a first hub having an inner diameter splined section having a first extreme rearward neutral position with exclusive torsional engagement with said output shaft, and in a second intermediate high gear position, said inner diameter spline section having torsional engagement with said output shaft and said input shaft, and in a third forward extreme low gear position said inner diameter spline section having exclusive torsional engagement with said input shaft;
a second hub rotatably mounted on said first hub and being axially fixed therewith, said second hub being torsionally fixed to said output shaft;
a shift fork to translate said second hub;
a planetary gear set having a ring gear fixed with said housing, a plurality of planet gears meshed with said ring gear and connected to each other by carrier, said carrier having connected pins extending through said planet gears, a sun gear with an exterior meshed with said planet gears; and
wherein in said first extreme rearward neutral position said output shaft is disengaged from said input shaft, and in said second intermediate position said input shaft is directly connected to said output shaft without rotating said planetary gear set, and in said third extreme forward position said first hub torsionally connects said input shaft to said sun gear and said second hub is torsionally connected with said carrier at a diameter less than that of said carrier pin to give said transfer case a reduced low gear output.

8. A method of operating a vehicle transfer case for a vehicle comprising:
providing a housing;
providing an input shaft rotatably mounted within said housing;
providing an output shaft rotatably mounted within said housing axially aligned with said input shaft;
providing a secondary shaft selectively driven by said output shaft, said secondary shaft being rotatably mounted by said housing;
providing a first hub having an inner diameter splined section having in a first extreme neutral position with exclusive torsional engagement with said output shaft, and in a second intermediate high position, said inner diameter spline section having torsional engagement with said output shaft and said input, and in a third extreme low position, said inner diameter spline section having exclusive torsional engagement with said input shaft;
providing a second hub rotatably mounted on said first hub and being axially fixed therewith, said second hub being torsionally fixed to said output shaft;
providing a shift fork to translate said second hub;
providing a planetary gear set having a ring gear fixed with said housing, a plurality of planet gears meshed with said ring gear and connected to each other by carrier, said carrier having connected pins extending through said planet gears, a sun gear with an exterior meshed with said planet gears; and
placing said first hub in an extreme rearward neutral position disengaging said output shaft from said input shaft, and placing said first hub in said intermediate position directly connecting said input shaft to said output shaft without rotating said planetary gear set, and placing said first hub in said extreme forward position torsionally connecting said input shaft to said sun gear and torsionally connecting said second hub with said carrier to give said transfer case a reduced low gear output.

9. The method of operating a transfer case of claim 8 further including sensing when said first hub is in the first position.

10. The method of operating a transfer case of claim 9 wherein the sensing includes making contact with one of a group including a second hub or a shift fork.

11. The method of operating a transfer case of claim 8 wherein placing the first hub in the third extreme position is moving the first hub forward.

12. The method of operating a transfer case of claim 8 of torsionally connecting said carrier to said second hub at a diameter less than that of said carrier pin.

* * * * *